United States Patent [19]
Weiste

[11] 3,820,688
[45] June 28, 1974

[54] MATERIAL DOSAGING APPARATUS

[76] Inventor: Heinrich Weiste, 4771 Sieningsen, Germany

[22] Filed: Aug. 13, 1973

[21] Appl. No.: 388,244

[30] Foreign Application Priority Data
Aug. 24, 1972 Germany.......................... 2241534

[52] U.S. Cl................................ 222/193, 222/411
[51] Int. Cl................................................ B67d 5/54
[58] Field of Search .......... 222/136, 140, 142, 144, 222/167, 168, 193, 367, 368, 410, 411; 239/654, 665

[56] References Cited
UNITED STATES PATENTS
3,036,745  5/1962  Johnson............................ 222/411
3,261,514  7/1966  Haley et al........................ 222/410

Primary Examiner—Robert B. Reeves
Assistant Examiner—Larry H. Martin
Attorney, Agent, or Firm—Merchant, Gould, Smith & Edell

[57] ABSTRACT

A dosaging apparatus for pneumatically operating distributor systems is disclosed, for the distributing of material in particle form such as seed goods, fertilizers and other granulates, having a dosaging apparatus connected with a supply hopper and provided with an inlet hopper, and having an air supply duct which is connected with the dosaging apparatus and opens into a conveying conduit for the dosaged material, through which the material is supplied to distributors.

11 Claims, 6 Drawing Figures

PATENTED JUN 28 1974  3,820,688

MATERIAL DOSAGING APPARATUS

BACKGROUND OF THE INVENTION

Agricultural machines operating with pneumatic dosaging and distributor apparatus are used widely at the present time, as for example German Pat. specification No. 1,946,213. These known apparatus have the disadvantage that if different kinds of material are to be dosaged and distributed, each type of material requires a dosaging apparatus specially adapted to that type. On the other hand, the requirements in agriculture are tending towards allowing several materials to be dosaged, distributed and put into or onto the ground at the same time. Thus for example it is necessary to distribute seeds together with fertilizer and/or with chemical granulates, such as herbicides, fungicides and insecticides. All these five materials have different kinds of consistency, and more particularly different weight per unit of volume, so that hitherto it has not been possible to dosage them together in a satisfactory manner with one dosaging apparatus.

SUMMARY OF THE INVENTION

The present invention provides a dosaging apparatus which is characterized by a round trough or tub moved in a rotating motion and having a downwardly sloping central portion with a central aperture, which is connected above and below with the ejector unit and which has an annular external portion for receiving the material being dosaged. Preferably the arrangement is such that a partition wall which is stationary relative to the tub is provided which separates the central portion and the external annular portion from one another and is provided with one or more through flow apertures for the material. Preferably, arranged in the path of conveyance of the external annular portion, are stationary deflector walls which lead towards the material through flow apertures and in which air through flow apertures shielded from the material by means of elastic aprons can be provided, so that in the region of the deflector wall air introduced through the through flow apertures provides an air cushion which may contribute to uniform and trouble free removal of the material contained in the path of conveyance in the external annular portion.

In the region of the material being dosaged, it is possible to arrange upstream of each deflector wall as viewed in the direction of conveyance, an aperture communicating with the outside atmosphere, through which air is drawn, which may contribute to conveying away smoothly any material which may tend to accumulate here.

The outflow quantity of material from the inlet hopper into the external portion may be regulated by gates or slide valves which preferably have flanges at the lower edge to act as leveling plates extending in the direction of conveyance of the material, so that it is not possible to build up a ridge of conveyed material behind the slide valve.

In order to achieve further dosaging of the material flowing from the external portion to the central portion and delivered by the central portion into the ejector unit, the extension portion of the ejector unit can be provided with a vertically adjustable collar which limits the quantity of material flowing over the downwardly sloping central portion.

The inlet hoppers are preferably arranged opposite one another on the periphery of the tub, so that the material delivered by these inlet hoppers into the tub in the region of the path of conveyance of the external portion describes a path of travel of about 180°.

If the hoppers arranged for example opposite one another are divided into two regions, it becomes possible to mix four types of material with one another in the desired proportions already within the path of conveyance of the external portion of the tub. If further types of material are to be mixed, of course, the division of the inlet hoppers into several regions is also possible. Preferably, however, it is additionally proposed that there can be attached in the interior of the tub formed by the partition wall or externally on the tub, conveying rings which have a base formed by two lips abutting in sealing-tight manner and into which a discharge tube engages so that the material present in these conveying rings can be deposited by this tube for example beside a drill furrow or on to a drill furrow already drawn over, or into the drill furrow in front of seed being dosaged.

In order to achieve as uniform introduction of the conveying air as possible according to a further feature it is proposed that a radial-axial fan is used whose suction side is arranged at the external periphery and whose delivery side is arranged centrally.

With such an arrangement it is possible for the main dosaging apparatus to supply fertilizer and various seed goods or other granulates in a dosaged manner to the distributor system, e.g. a drill machine. With this machine it is also possible of course to couple other microgranulate scattering devices. If the discharge tube for the additional conveying rings is introduced internally into the tub, this additional material is discharged also into the air of the distributor system.

Particular embodiments of the invention will now be described by way of example only with reference to the accompanying drawings in which.

Figure 1:
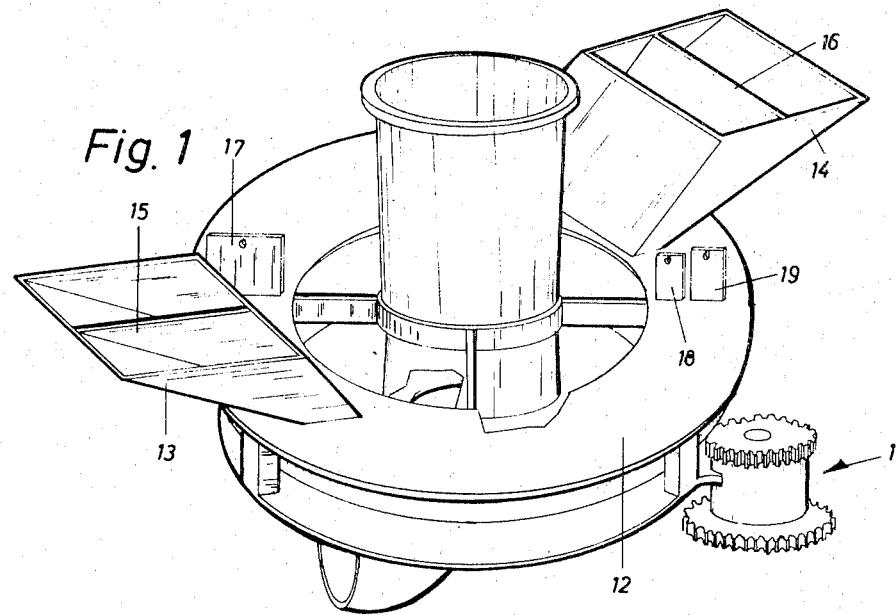
FIG. 1 shows a perspective view of a dosaging apparatus.

In the drawings, the reference numeral 1 in general designates a drive which drives a rotatable mobile tub 2 for example by means of the inter-engaging gear wheels 3, 4.

The tub 2 has an external portion 5 which is annular in shape and a central portion 6 which slopes downwards in an inward direction. The external portion 5 and central portion 6 are separated from one another by a portion of a stationary frame comprising partition wall 7 which by means of an elastic sealing lip 8 engages on the upper side of the bottom of the external portion 5.

Opening into a central aperture of the downwardly sloping central portion 6 is an ejector unit which consists of a collecting nozzle 9 and an extension portion 10 and through which air is conducted for the distributor system. Adjoining the lower end of the extension portion 10 is a collar 11 which is vertically adjustable and as a result provides between its lower edge and the upper side of the bottom of the central portion 6 a defined through flow aperture which is annular in shape.

Figure 4:
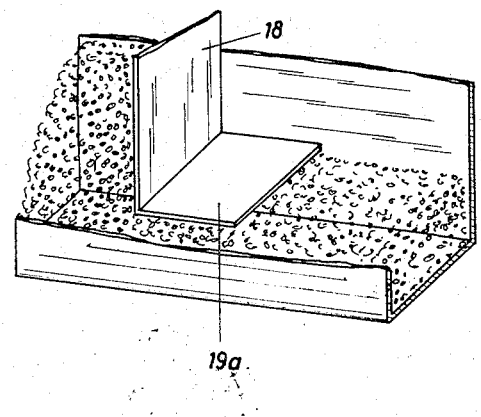
FIG. 4 shows in larger scale a detail of a slide valve.

Arranged on a stationary wall 12, which comprises another part of the stationary frame and forms the upper boundary of the external annular portion 5, are material inlet hoppers 13 and 14 which can be subdivided into individual hoppers by partition walls 15 and 16. Downstream of the mouths of the inlet hoppers 13 and 14 as viewed in the direction of conveyance of material there are arranged slide valves 17, 18 and 19 which determine the depth of the material flowing out of the hopper into the external portion 5. These slide valves are provided with a flange 19a (FIG. 4) which adjoins at right angles as viewed in the direction of conveyance, which prevents a wave of material building up behind the slide valve.

Arranged over the bottom of the rotatable external annular portion 5 are stationary deflector walls 20 and 21 which conduct the material to outlet apertures 22 and 23 provided in the inner partition wall 7.

The deflector walls 20 and 21 on the stationary frame are provided with air through flow apertures 24 which have in the region of the material being conveyed, deflector aprons 25, air being blown in through these air apertures is directed oppositely to the direction of conveyance of the flow of material, so that there is no risk of the conveyed and dosaged material accumulating at these walls.

According to a modified constructional form not shown in the drawings, it is also possible to arrange that there are through flow apertures in the upper wall 12 which open to the atmosphere upstream of the deflector walls 20, 21 in the direction of conveyance. Owing to the negative pressure which is produced, in this case air drawn in when the dosaging apparatus operates, and this air contributes to satisfactory removal of the dosaged material which might tend to accumulate or pile up at the walls 20, 21.

It is possible to arrange these apertures to be capable of being closed and also to make the free annular aperture between the wall 7 and the extension portion 10 capable of being closed, so that the pressure which occurs when one or other aperture is opened or closed can be adjusted.

Figure 3:
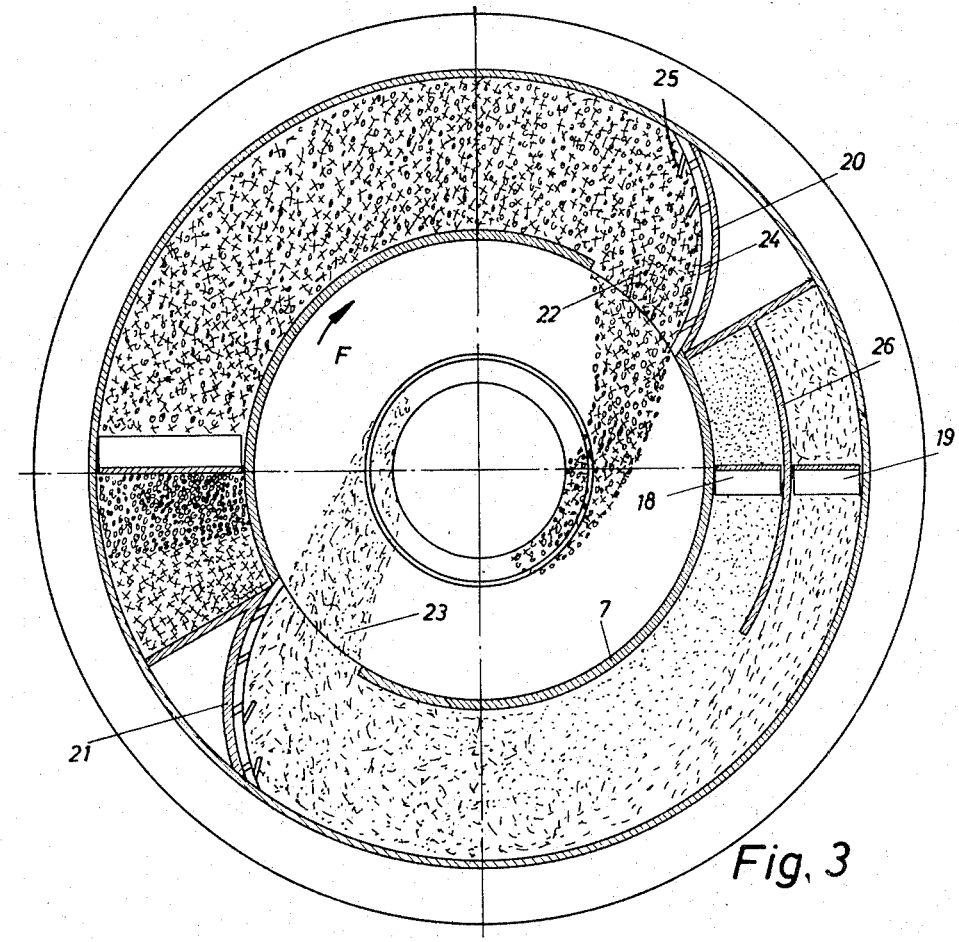
FIG. 3 shows a plan view with the upper portion removed.

The tub 2 rotates in the direction of the arrow F shown in FIG. 3.

Figure 2:
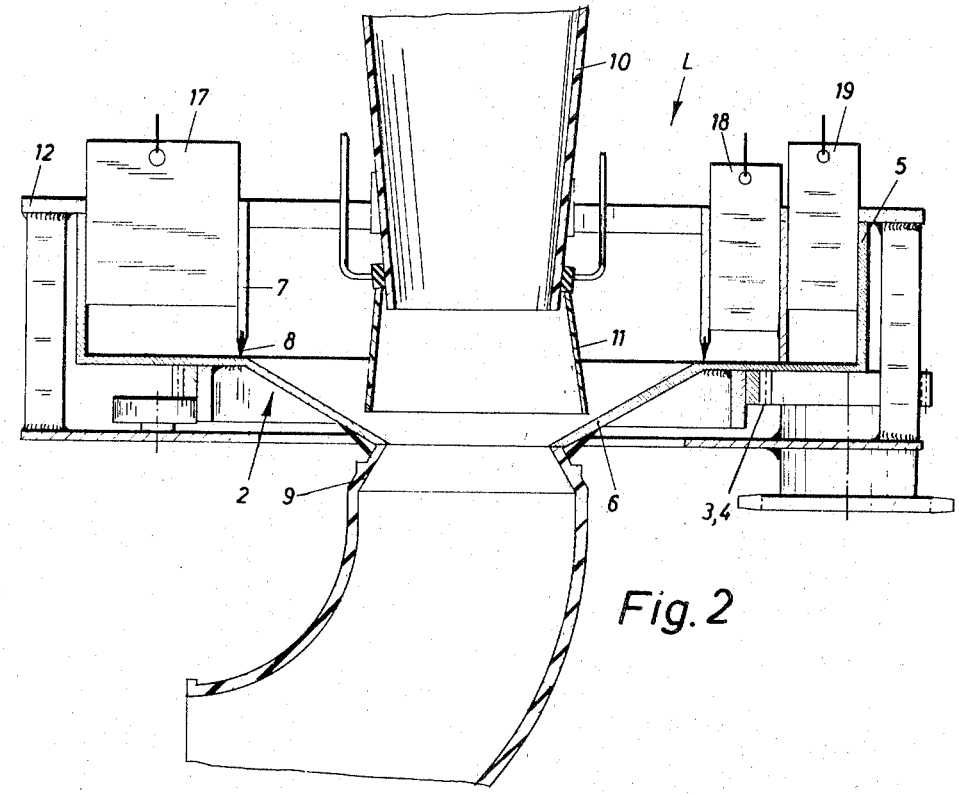
FIG. 2 shows a section through the dosaging apparatus of FIG. 1.

The method of operation of this arrangement illustrated in FIGS. 1 to 3 will be explained briefly hereinafter.

The material introduced through the inlet hoppers 13 and 14 arrives at the outlet side of the hoppers into the external annular portion 5 of the rotating tub 2, the height of the layer and thus the quantity of this issuing material being determined by the setting of the slide valves 17, 18 and 19. At the left hand side of the illustrations in FIGS. 1 to 3 a single slide valve is provided for the two materials coming from the hopper 13, whereas in the right hand portion of the illustrations two slide valves are provided and one guide wall 26 is provided at least for a portion of the path of conveyance of the material in the external portion.

The material being dosaged is carried along by the rotating tub in the direction of the arrow F, arrives at the stationary deflector walls 20, 21 and is guided through the outlet apertures 22 and 23 into the downwardly sloping central portion 6 of the tub 2 and arrives here at the region of influence of the ejector formed by the collecting nozzle 9 and extension piece 10. At the edge of the central aperture of the central portion 6 the material is scraped off and enters the air flow of the distributor system.

In order to prevent air being drawn by suction out of the center of the tub 2, air can be introduced in accordance with the arrow L.

Figure 5:
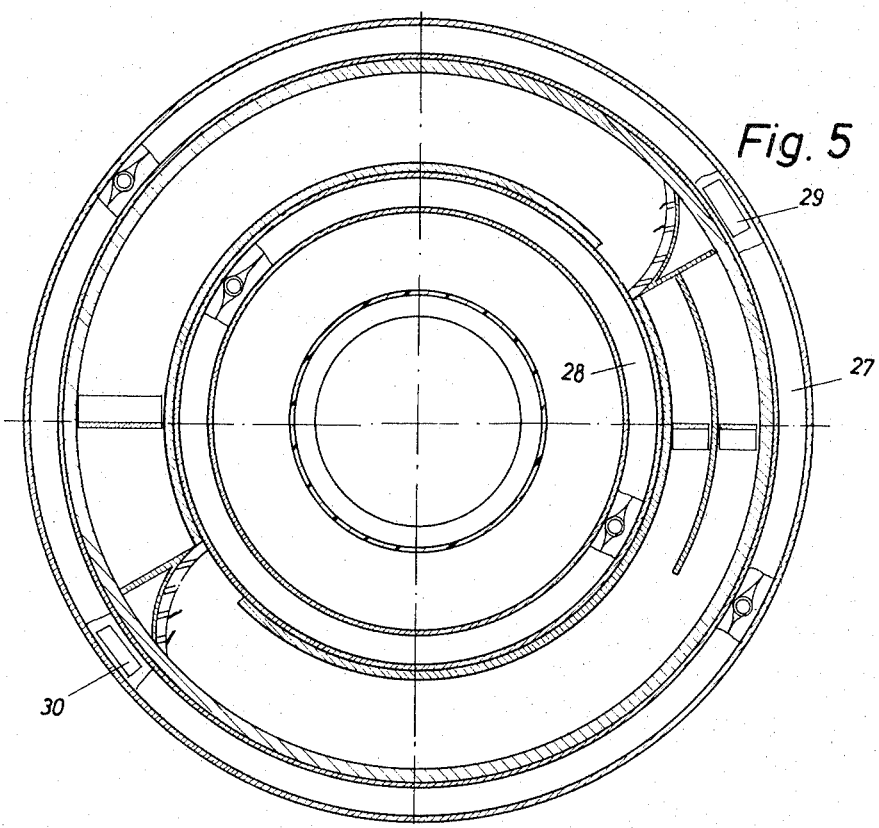
FIG. 5 shows a plan view onto the dosaging apparatus shown in FIG. 3 with attached conveying rings.

In order to increase further the quantity of material being dosaged, additional conveying rings 27 and 28 can be provided as shown in FIG. 5. The inlet hoppers necessary for example for the conveying ring 27 are shown at 29 and 30. These conveying rings have, as shown at 31 and 32 their own slide valve systems and are provided at their underside with two elastic lips 33 and 34 forming the bottom portion. At the region where the material is to be discharged, discharge tubes 35 and 36 enter these elastic lips, and through these tubes the material then flows out and can be guided into the central distributor system or discharged separately onto the ground.

Instead of the attached additional conveying rings 27 and 28 the actual tub 2 can also be of double construction, that is to say the bottom surface of the tub can extend beyond the side wall 5 so that as a result the quantity of material being dosaged can be further increased.

Figure 6:
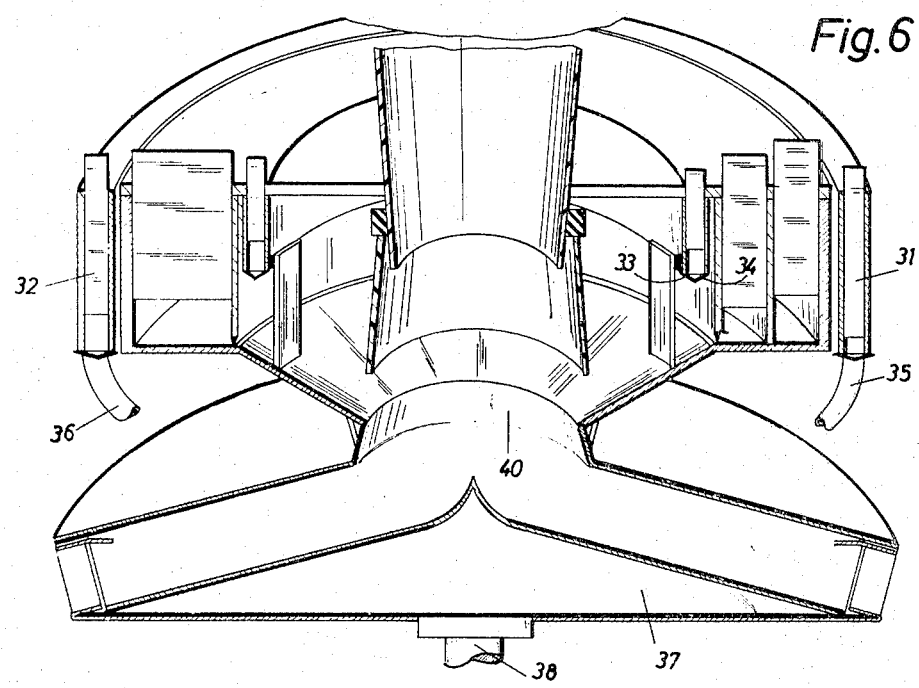
FIG. 6 shows the dosaging apparatus of FIG. 5 with another fan.

FIG. 6 shows additionally a fan 37 which seems to be particularly useful for the round dosaging apparatus as described hereinbefore and which is driven centrally at 38 and has blades 39 arranged at the external periphery and supplying air to a central outlet aperture 40. As a result uniform distribution of the air is achieved over the edge of the central aperture in the central portions and thus uniform further conveyence of the material. It will be apparent that the material of the dosaging apparatus is made to be appropriately resistant having regard to the chemical granulates which have to be dealt with.

It also seems advantageous to arrange the actual dosaging apparatus on the supply tanks of an agricultural distributing machine in such a manner as to be quickly detachable in a downward direction by the use of rapid-action fastening, so that easy cleaning is possible.

An interchangeable transmission ratio should preferably be provided for the drive, so that the tub can be driven slowly with small quantities of material and made to rotate rapidly with larger quantities.

As described above it becomes possible on the one hand to construct a wide machine with a light construction which over a considerable width can distribute all materials in a single run through the field being dealt with, even different kinds of materials, and the dosaging is carried out with a single dosaging apparatus, in order thus on the one hand to reduce the outlay required for producing and using complicated and therefore expensive dosaging apparatus and on the other hand to provide a possibility of supplying this single dosaging apparatus from a centrally mounted supply tank divided into different containers.

What is claimed is:

1. A dosaging apparatus for pneumatically operating systems for distributing particulate or granulate material, comprising:
   a. a stationary frame;
   b. a round tub mounted for rotation on the frame, having a downwardly sloping central portion with a central aperture, and an annular external portion;
   c. at least one inlet hopper mounted on said frame so as to deposit a selected material on the external portion of the rotating tub;
   d. means for rotating the tub;
   e. means on the stationary frame for deflecting the material on the rotating external portion onto the sloping central portion;
   f. an ejector unit including a collecting nozzle spaced from an extension portion, through which air is conducted to carry material from the central aperture to a distribution system; and
   g. means mounting the ejector unit at the central aperture.

2. A dosaging apparatus according to claim 1, wherein the frame includes a partition wall between the annular external portion and the central portion and which is stationary relative to the rotatable tub and has at least one through flow aperture for the material from the annular external portion to pass towards the central aperture.

3. A dosaging apparatus according to claim 2, wherein the means on the stationary frame for delfecting includes a stationary deflector wall arranged in the path of conveyance of the material by rotation of the external portion and which leads toward the flow aperture.

4. A dosaging apparatus according to claim 3, wherein air through flow apertures are arranged in the deflector wall and are shielded from the material being conveyed by means of elastic aprons.

5. A dosaging apparatus according to claim 3, having communicating apertures with the outside atmosphere arranged upstream of the deflector wall as viewed in the direction of conveyance, above the material being conveyed.

6. A dosaging apparatus according to claim 1, which further includes slide valves for regulating the discharge quantity of material from the inlet hopper into the external portion.

7. A dosaging apparatus according to claim 6, wherein the slide valves have flanges extending in the conveying direction of the material at the lower edge of the slide valves acting as leveling plates on the material.

8. A dosaging apparatus according to claim 1, wherein inlet hoppers are arranged opposite one another on the periphery of the tub.

9. A dosaging apparatus according to claim 1, wherein the ejector unit is vertically positioned and which includes a collar which is vertically adjustable at the lower end of the extension portion above the collecting nozzle of the ejector unit.

10. A dosaging apparatus according to claim 1 which includes conveying rings which can be attached adjacent the external portion of the tub and which each have a bottom portion formed by two lips abutting in sealing-tight manner and a discharge tube extending into the said bottom portion.

11. A dosaging apparatus according to claim 1 which includes a radial-axial fan whose suction side is arranged on the external periphery and whose delivery side is arranged centrally and in communication with said ejector unit.

* * * * *